US007205176B2

United States Patent
Chen et al.

(10) Patent No.: US 7,205,176 B2
(45) Date of Patent: Apr. 17, 2007

(54) SURFACE MEMS MIRRORS WITH OXIDE SPACERS

(75) Inventors: Fei-Yuh Chen, Hinchu (TW); Wei-Ya Wang, Dalin Township, Chiayi County (TW); Yuh-Hwa Chang, Shulin (TW); Tzu-Yang Wu, Hsinchu (TW)

(73) Assignee: Taiwan Semiconductor Manufacturing Company, Hsin-Chu (TW)

( * ) Notice: Subject to any disclaimer, the term of this patent is extended or adjusted under 35 U.S.C. 154(b) by 81 days.

(21) Appl. No.: 10/978,011

(22) Filed: Oct. 29, 2004

(65) Prior Publication Data

US 2005/0260784 A1 Nov. 24, 2005

Related U.S. Application Data

(60) Provisional application No. 60/573,797, filed on May 24, 2004.

(51) Int. Cl.
*H01L 21/00* (2006.01)

(52) U.S. Cl. .............................. 438/72; 438/48; 438/69; 438/669; 257/E21.613

(58) Field of Classification Search ...................... None
See application file for complete search history.

(56) References Cited

U.S. PATENT DOCUMENTS 5,430,328 A 7/1995 Hsue

| 6,307,266 | B1 | 10/2001 | Yung |
| 6,376,355 | B1 | 4/2002 | Yoon et al. |
| 2005/0094240 | A1* | 5/2005 | Huibers et al. ............. 359/290 |
| 2005/0214976 | A1* | 9/2005 | Patel et al. ................. 438/107 |

OTHER PUBLICATIONS

Wolf et al., "Silicon Processing for the VLSI Era", vol. 1: Process Technology, 1986, Lattice Press, pp. 183-184.*
Peter F. Van Kessel et al., "A MEMS-Based Projection Display," IEEE Expert, vol. 86, No. 8, Aug. 1998, 1 page.
Peter F. Van Kessel, A MEMS-Based Projection Display, Proceedings of the IEEE, vol. 86, No. 8, Aug. 1998, pp. 1687-1704.

* cited by examiner

*Primary Examiner*—Michael Lebentritt
*Assistant Examiner*—Cheung Lee
(74) *Attorney, Agent, or Firm*—Duane Morris LLP

(57) ABSTRACT

An MEMS mirror structure is formed using an etching process that forms sidewall oxide spacers while maintaining the integrity of the oxide layer formed over the reflective layer of the MEMS mirror structure. The discrete mirror structure is formed to include a reflective layer sandwiched between oxide layers and with a protect layer formed over the upper oxide layer. A spacer oxide layer is formed to cover the structure and oxide spacers are formed on sidewalls of the discrete structure using a selective etch process that is terminated when horizontal portions of the spacer oxide layer have cleared to expose the release layer formed below the discrete mirror structure and the protect layer. The superjacent protect layer prevents the spacer oxide etch process from attacking the upper oxide layer and therefore maintains the integrity of the upper oxide layer and the functionality of the mirror structure.

18 Claims, 5 Drawing Sheets

SURFACE MEMS MIRRORS WITH OXIDE SPACERS

RELATED APPLICATION

The present invention is related to and claims priority of, U.S. Provisional Application No. 60/573,797, filed May 24, 2004 and entitled Surface MEMS Mirrors With Oxide Spacers, the contents of which are incorporated herein, as if set forth in their entirety.

FIELD OF THE INVENTION

The present invention relates, most generally, to structures and methods for forming semiconductor devices. More particularly, the present invention is related to forming microelectromechanical (MEMS) mirror structures by forming a releasable protect layer over the upper oxide layer of the mirror structure and etching to form sidewall spacers that isolate the mirror structures from one another, without compromising the integrity of the upper oxide layer.

BACKGROUND OF THE INVENTION

MEMS (microelectromechanical structures) are flexible cantilever-type structures that have many applications and an even greater potential in today's advancing technologies. MEMS are formed using semiconductor processing technology and over substrates that may be formed of semiconductive or insulating materials. For example, MEMS may be deflectable mirror structures that can reflect light in different directions. In recent years, the projection-display industry has undergone a period of explosive growth. Until several years ago, such projection display systems were predominantly based on ether cathode-ray tube (CRT) or active-matrix liquid crystal display (LCD) technology. All of these traditional display systems, however, suffer from limitations that compromise their performance or the spectrum of their applicability. LCD- and CRT-based systems are limited in their ability to support high-brightness applications, and they suffer from uniformity and stability problems in large-scale applications.

An emerging projection display technology called Digital Light Processing (DLP) accepts digital video and transmits to the eye a burst of digital light pulses that the eye interprets as a color analog image. Digital light processing is based on a MEMS device known as the Digital Micromirror Device (DMD) invented in 1987 at Texas Instruments Inc. The DMD is a fast reflective digital light switch, which combines with image processing, memory, and a light source and optics to form a digital light processing system. The DMD is a light switch that uses a plurality of electrostatically controlled MEMS mirror structures to digitally modulate light, producing high-quality imagery on screen.

The MEMS used to form the plurality of light switches are typically formed over CMOS memory devices and using CMOS-like processes. Each light switch includes a deflectable aluminum alloy mirror that can reflect light in different directions depending on the state of the underlying memory cell. Mirror quality has been found to be the most important factor in the performance of DLP and similar systems. The deflectable mirror film of the MEMS, commonly an aluminum alloy and preferably an aluminum-silicon-copper material, is formed over a releasable layer commonly referred to as a sustain layer. The sustain layer is formed between the mirror film and the substrate and is removed after the mirror layer has been formed into a plurality of discrete mirror structures that are anchored to the substrate to form cantilever-type MEMS. A preferred sustain layer material is amorphous silicon. When amorphous silicon is used as the sustain layer, however, spiking problems between the metallic mirror layer and the amorphous silicon were prevalent. To avoid this, an insulating barrier layer was added both above the metallic mirror layer and below the metallic mirror layer, i.e., between the metallic mirror layer and the release layer. Even with insulating barrier layers formed above and below the metallic mirror layer, spiking still occurred because, after etching to form the discrete mirror structures, exposed sidewalls of the metallic mirror layer were present. Sidewall spiking causes mirrors to be coupled to one another such that they could not operate independently and also resulted in spiking between the mirror layer and the release layer, resulting in other functional problems. It is now known to use oxide spacers on the sidewalls to address this problem. The formation of sidewall oxide spacers on a MEMS structure, however, is a process that is difficult to control.

Oxide spacers are formed by first forming a discrete, etched mirror structure then forming an oxide layer over the structure, including vertically over the sidewalls. A blanket etch operation is then carried out to remove horizontal portions of the oxide layer while desirably leaving vertical sections intact to form sidewall spacers. The blanket, "etch back" process is difficult to control and underetching produces a residual oxide film linking mirrors together after the sustain layer is released. If the mirrors are coupled to one another in this manner, they cannot operate independently. Overetching the oxide film attacks the oxide layer above the mirror layer. When the upper oxide layer is attacked, its thickness is reduced. Attack of the upper oxide layer significantly influences the bending characteristics and reflectivity of the mirrors which are very sensitive to the thickness and uniformity of the oxide layers above the metallic mirror layer. Since the horizontal and vertical portions of the oxide film are the same material, in fact, the same film, there is no selectivity between the vertical and horizontal portions and the blanket etch process cannot be reliably terminated when only the horizontal sections are removed. Ironically, using conventional methods and substructures, the layer upon which the spacer etch is desirably terminated is also an oxide layer—the critical upper oxide layer disposed beneath the spacer oxide film being etched. Since the materials are the same, it is impossible to automatically endpoint the etch process which often results in the subjacent "upper oxide barrier layer" being attacked, damaging the mirror structure.

It would therefore be desirable to provide a method and structure for producing a MEMS mirror structure by reliably etching an oxide layer formed over the mirror structure and accurately terminating the etch operation so that no oxide remains between mirrors, spacers are reliably formed, and the oxide formed over the mirrors is free from damage.

SUMMARY OF THE INVENTION

To achieve these and other objects, and in view of its purposes, the present invention addresses the shortcomings of conventional technology and provides a method and structure for forming a MEMS mirror structure with oxide barrier layers surrounding the mirror layer. More particularly, the invention provides for etching an oxide layer formed over a MEMS structure to form sidewall spacers while maintaining the integrity of the critical oxide layer disposed over the metallic mirror layer of the MEMS structure.

In one embodiment, the invention provides a method for forming a deflectable semiconductor mirror structure. The method includes providing a discrete films structure having sidewalls, the discrete films structure disposed on a release layer formed over a substrate and including a releasable protect layer formed over a mirror substructure comprising an upper oxide layer disposed over a reflective layer disposed over a lower oxide layer. The method further provides for forming a spacer oxide layer over the discrete films structure, the spacer oxide layer including horizontal portions and vertical portions adjacent the sidewalls, and etching to form sidewall spacers on the sidewalls.

In another embodiment, the invention provides a method for forming a deflectable semiconductor mirror structure. The method includes providing a mirror substructure disposed on a release layer disposed on a substrate, the mirror substructure comprising an upper oxide layer disposed over a metal layer disposed over a lower oxide layer. A releasable protect layer is formed over the mirror substructure. The method further provides etching to form an etched discrete structure of the mirror substructure and the releasable protect layer; and forming oxide spacers laterally adjacent the etched discrete structure by blanket oxide etching an oxide film formed over the etched discrete structure, and terminating the blanket oxide etching when the releasable protect layer is exposed.

In another embodiment, the invention provides a method for forming a deflectable semiconductor mirror structure. The method includes providing a mirror substructure disposed on a release layer formed over a substrate, the mirror substructure comprising an upper oxide layer disposed over a metallic layer disposed over a lower oxide layer, etching the mirror substructure to form sidewalls, and forming oxide spacers on the sidewalls from a film other than the upper oxide layer, while retaining the upper oxide layer substantially intact.

In still another embodiment, the invention provides a semiconductor MEMS mirror structure comprising a mirror structure formed over a substrate and including a lower oxide layer, a reflective layer disposed over the lower oxide layer, an upper oxide layer disposed over the reflective layer, a protect layer disposed over the upper oxide layer and a spacer oxide layer formed on the mirror structure including on sidewalls of the mirror structure.

In yet another embodiment, the invention provides a semiconductor MEMS mirror structure including a discrete mirror structure formed over a substrate and having sidewalls and a lower oxide layer. A reflective layer is disposed over the lower oxide layer, an upper oxide layer disposed over the reflective layer and a protect layer is disposed over the upper oxide layer. Segments of a further oxide film form spacers on the sidewalls including adjacent the protect layer.

BRIEF DESCRIPTION OF THE DRAWING

The present invention is best understood from the following detailed description when read in conjunction with the accompanying drawing. It is emphasized that, according to common practice, the various features of the drawing are not necessarily to-scale. On the contrary, the dimensions of the various features are arbitrarily expanded or reduced for clarity. Like numerals denote like features throughout the specification and drawing. Included are the following figures which are cross-sectional views illustrating a sequence of processing operations according to an embodiment of the present invention.

DETAILED DESCRIPTION

Figure 1:
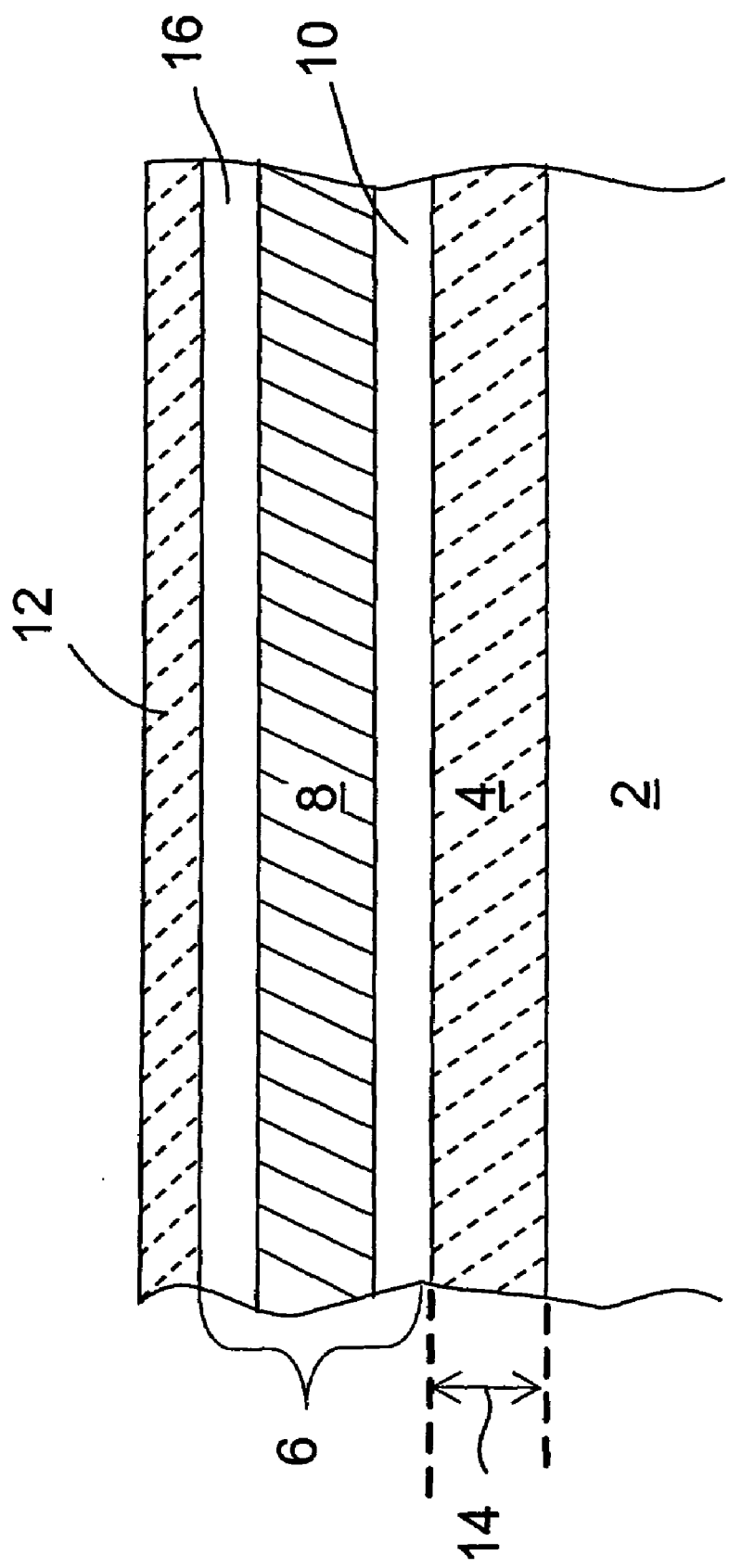
FIG. 1 shows a releasable protect layer formed over films used to form a MEMS mirror structure.

FIG. 1 is a cross-sectional view showing a stack of films formed over a substrate. Substrate 2 may be a glass, sapphire, or silicon substrate or any of various other substrates commonly used in the semiconductor manufacturing industry. Release layer 4 is formed over substrate 2 and may be formed of amorphous silicon in one exemplary embodiment but other materials such as tungsten or tungsten silicon may be used in other exemplary embodiments. Release layer 4 includes thickness 14 which may range from 200 to 2000 angstroms in various exemplary embodiments. The release layer sustains or supports the MEMS structure being formed above it, during the deposition and etching manufacturing processes used to form the MEMS. After the discrete mirror structures are formed above release layer 4 and anchored to the substrate, release layer 4 will be removed producing a gap between the mirror structure and substrate as will be shown in subsequent figures.

Mirror substructure 6 includes lower oxide layer 10, reflective film 8 and upper oxide layer 16. Either or both of lower oxide layer 10 and upper oxide layer 16 may be formed by plasma enhanced oxidation and they may each include a thickness of about 400 angstroms but other materials and other thicknesses may be used in other exemplary embodiments. Reflective layer 8 may be an aluminum alloy and in one exemplary embodiment reflective layer 8 may be aluminum-silicon-copper formed to a thickness of 2500 angstroms. In other exemplary embodiments, other reflective materials may be used and may include thicknesses ranging from 1500–4000 angstroms. Protect layer 12 is formed over mirror substructure 6. Protect layer 12 is a releasable layer and it may advantageously be formed of the same material as release layer 4. For example, each of release layer 4 and protect layer 12 may be formed of amorphous silicon. Protect layer 12 may include a thickness ranging from 200 to 600 angstroms and in one embodiment may be of about 400 angstroms, but other thicknesses may be used in other exemplary embodiments. Protect layer 12 and release layer 4 are advantageously formed of materials that are commonly etchable.

Figure 2:
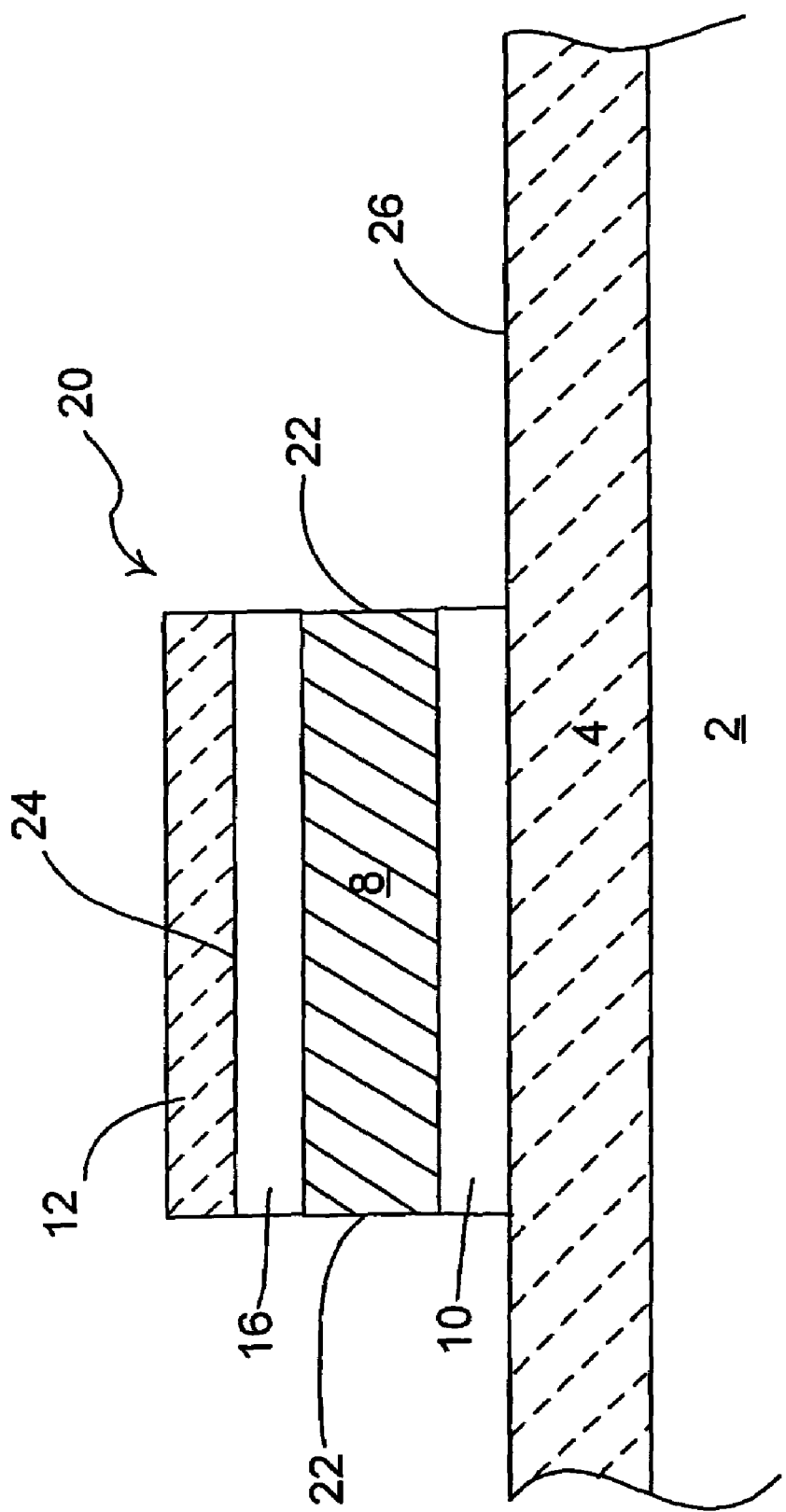
FIG. 2 shows a discrete structure formed by etching some of the films shown in FIG. 1.

Conventional methods may then be used to etch the structure shown in FIG. 1 to produce the etched films structure shown in FIG. 2. For example, a photolithograph pattern may be formed over the structure of FIG. 1 and then a sequence of plasma etching operations may be carried out to sequentially remove film portions and produce the discrete films structure shown in FIG. 2 after the photolithographic pattern is removed. Discrete structure 20 includes the films of the mirror substructure 6 shown in FIG. 1, namely, lower oxide layer 10, reflective layer 8 and upper oxide layer 16 as well as protect layer 12. The etching process is terminated when surface 26 of release layer 4 is exposed. Upper surface 24 of upper oxide layer 16 is protected from above by protect layer 12. Although not illustrated in the cross-section shown in FIG. 2, discrete structure 20 is preferably anchored to substrate 2 through release layer 4 at a location in front or behind the plane of the cross-section shown in FIG. 2.

Figure 3:
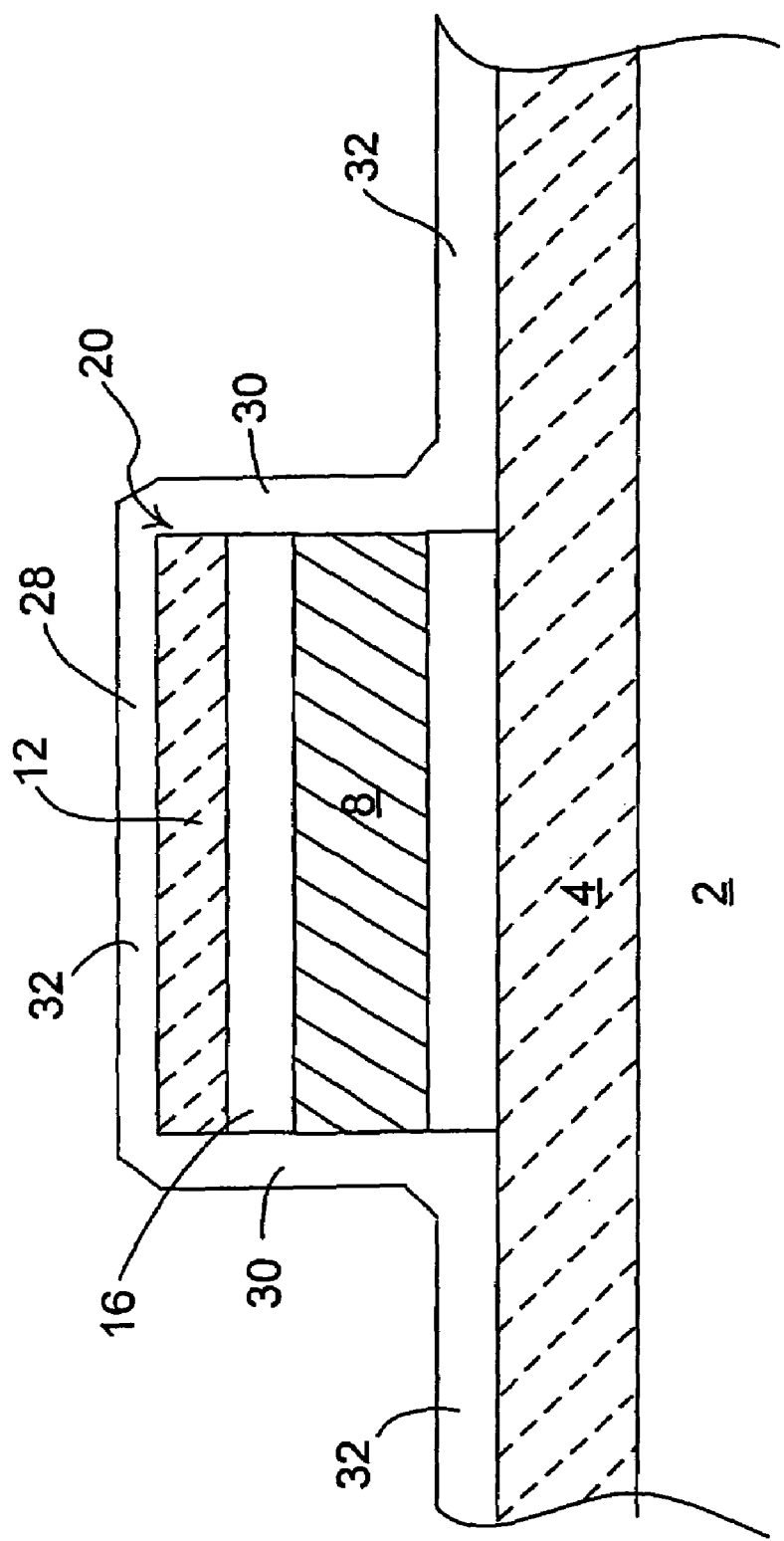
FIG. 3 shows the structure of FIG. 2 after an oxide layer has been formed over the structure of FIG. 2.

FIG. 3 shows spacer oxide layer 28 formed over discrete structure 20. In an exemplary embodiment, spacer oxide layer 28 may be formed using plasma enhanced oxidation and may include a thickness of about 400 angstroms but in other exemplary embodiments, spacer oxide layer 28 may be formed using other techniques and may include different thicknesses. Spacer oxide layer 28 includes horizontal portions 32 and sidewall portions 30. Deposition conditions are advantageously chosen such that spacer oxide film 28 is a conformal film.

Figure 4:
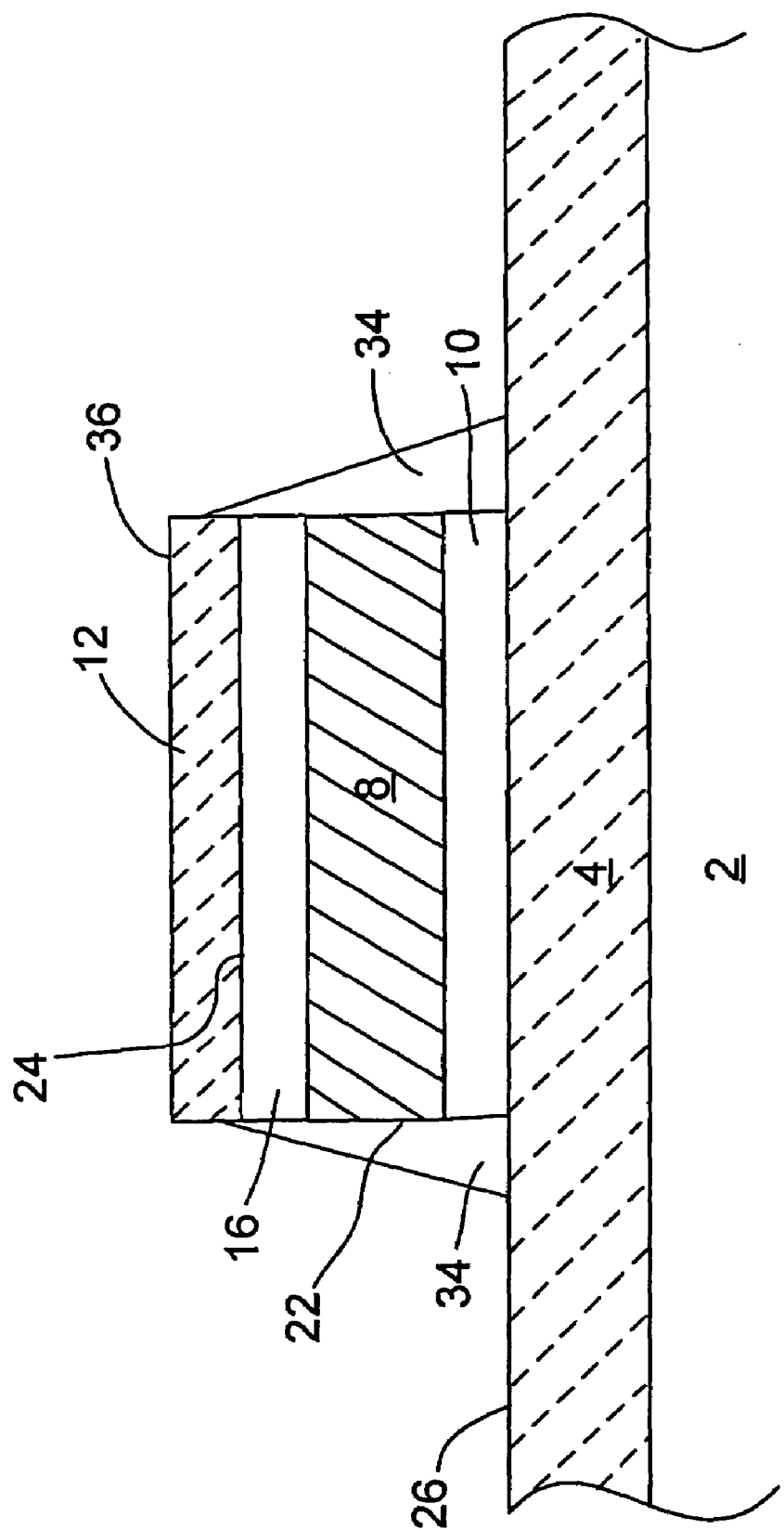
FIG. 4 shows the structure of FIG. 3 after oxide spacers have been formed by etching.

An aspect of the invention is that the blanket oxide etching process carried out to form spacers from spacer oxide film 28, can completely etch all horizontal portions of spacer oxide film 28 to ensure that oxide bridges are not present between the individual mirror structures formed from respective discrete structures 20, but will not attack upper oxide layer 16 due to the presence of superjacent protect layer 12. Conventional blanket oxide etching processes can be used to etch spacer oxide film 28 to produce spacers. More particularly, the etching process removes all horizontal portions of spacer oxide layer 28 and forms spacers 34 from the vertical portions as shown in FIG. 4. The etch is terminated when the horizontal portions of spacer oxide layer 28 have been removed i.e., "cleared" and surfaces 36 and 26 of protect layer 12 and release layer 4, respectively, are exposed. The etch process can be terminated using various conventional endpointing techniques that indicate when substantially all of the horizontal portions of spacer oxide film 28 have been cleared and surfaces 26 and 36, formed of another material, have been exposed. Release layer 4 and protect layer 12 are formed of materials that provide high selectivity to an oxide such that etching conditions used to etch spacer oxide film 28 do not substantially attack the "etch stop" films—release layer 4 and protect layer 12. While spacers 34 may extend to, or may be receded below, surface 36, oxide spacers 34 bound and protect the lateral portions of reflective layer 8 that form sidewalls 22. Upper oxide layer 16 is not attacked during the spacer etch process due to the presence of superjacent protect layer 12.

Figure 5:
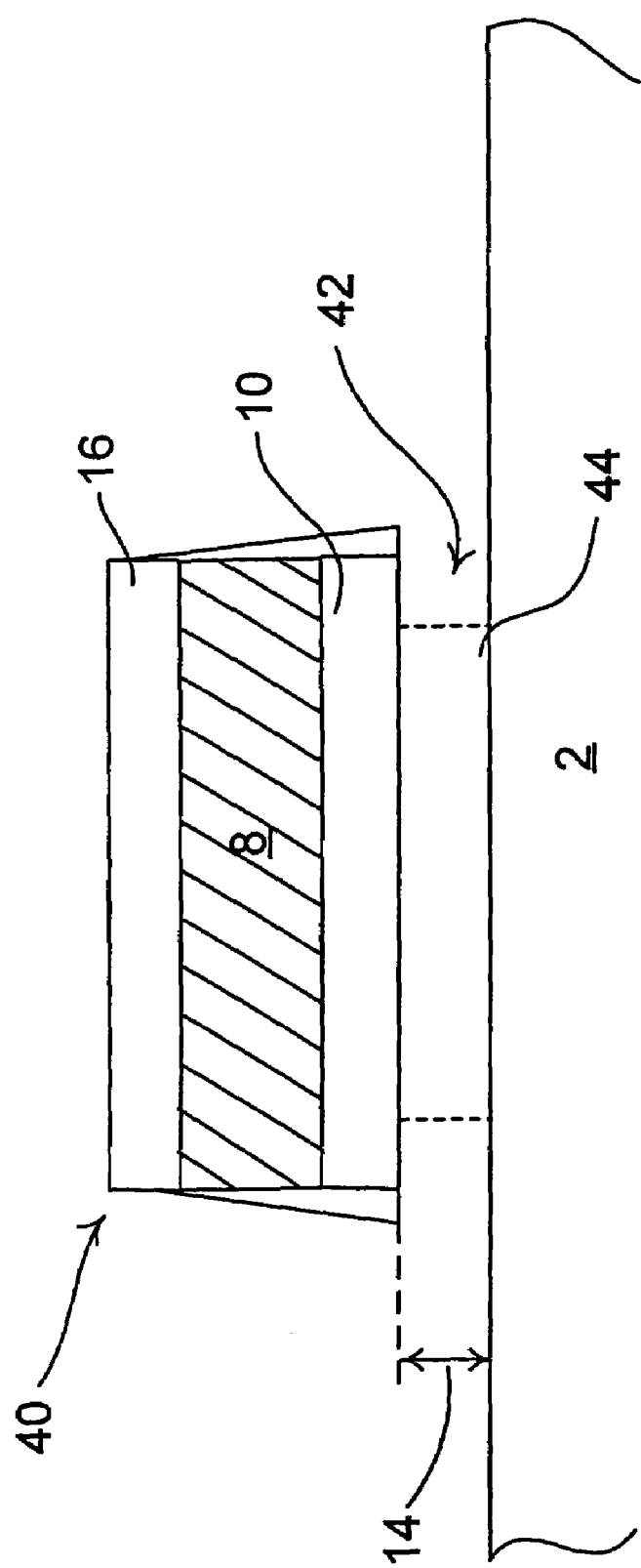
FIG. 5 shows the structure of FIG. 4 after release of the release layer and the releasable protect layer.

The structure shown in FIG. 4 is then subjected to a selective etch process that removes release layer 4 and protect layer 12 as shown in FIG. 5. Advantageously, release layer 4 and protect layer 12 may be formed of the same material and are equally etchable during the etching process which substantially does not etch the oxide layers or spacers or reflective layer 8. The selective etching process used to etch protect layer 12 and release layer 4 leaves upper oxide layer 16 substantially intact. Various etch chemistries may be used depending on the composition of release layer 4 and protect layer 12. Void 42 is produced between MEMS mirror structure 40 and substrate 2. MEMS mirror structure 40 is spaced from substrate 2 by distance 14, equivalent to thickness 14 of the removed release layer 4 shown in the previous figures. MEMS mirror structure 40 is anchored to substrate 2 by anchor 44 outlined in dashed lines to indicate a structure behind the plane of the cross-sectional view of FIG. 5.

The preceding merely illustrates the principles of the invention. It will thus be appreciated that those skilled in the art will be able to devise various arrangements which, although not explicitly described or shown herein, embody the principals of the invention and are included within its spirit and scope. Furthermore, all examples and conditional language recited herein are principally intended expressly to be only for pedagogical purposes and to aid the reader in understanding the principals of the invention and the concepts contributed by the inventors to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents and equivalents developed in the future, i.e., any elements developed that perform the same function, regardless of structure.

This description of the exemplary embodiments is intended to be read in connection with the figures of the accompanying drawing, which are to be considered part of the entire written description. In the description, relative terms such as "lower," "upper," "horizontal," "vertical,", "above," "below," "up," "down," "top" and "bottom" as well as derivatives thereof (e.g., "horizontally," "downwardly," "upwardly," etc.) should be construed to refer to the orientation as then described or as shown in the drawing under discussion. These relative terms are for convenience of description and do not require that the apparatus be constructed or operated in a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise.

Although the invention has been described in terms of exemplary embodiments, it is not limited thereto. Rather, the appended claims should be construed broadly, to include other variants and embodiments of the invention, which may be made by those skilled in the art without departing from the scope and range of equivalents of the invention.

What is claimed is:

1. A method for forming a semiconductor mirror structure, comprising:

providing a discrete films structure having sidewalls, said discrete films structure disposed on a release layer formed over a substrate, and including a releasable protect layer formed over a mirror substructure comprising an upper oxide layer disposed over a reflective layer disposed over a lower oxide layer;

forming a spacer oxide layer over said discrete films structure, said spacer oxide layer including horizontal portions and vertical portions adjacent said sidewalls; and etching to form sidewall spacers on said sidewalls.

2. The method as in claim 1, wherein said releasable protect layer and said release layer are etchable in the same etch process.

3. The method as in claim 1, wherein each of said releasable protect layer and said release layer is formed of amorphous silicon.

4. The method as in claim 1, further comprising etching to simultaneously remove said releasable protect layer and said release layer thereby forming a void between said substrate and said lower oxide layer and producing a MEMS.

5. The method as in claim 4, further comprising anchoring said mirror substructure of said discrete structure to said substrate.

6. The method as in claim 1, wherein said providing a discrete films structure comprises:

providing a substantially continuous film of said upper oxide layer over a substantially continuous film of said reflective layer over a substantially continuous film of said lower oxide layer;

forming said releasable protect layer on said upper oxide layer etching to form said discrete films structure.

7. The method as in claim 6, in which said etching comprises sequentially etching said releasable protect layer, said upper oxide layer, said reflective layer and said lower oxide layer.

8. The method as in claim 1, wherein said etching to form sidewall spacers comprises etching to remove said horizontal portions of said spacer oxide layer.

9. The method as in claim 8, wherein said etching to form sidewall spacers includes automatically terminating said etching when said horizontal portions clear.

10. The method as in claim 1, wherein at least one of said upper oxide layer and said lower oxide layer are formed by plasma enhanced oxidation.

11. The method as in claim 1, wherein said providing a discrete films structure includes said reflective layer formed of aluminum-silicon-copper.

12. The method as in claim 1, wherein said providing a discrete films structure includes said reflective layer formed of an aluminum-containing material.

13. The method as in claim 1, wherein each of said releasable protect layer and said release layer is formed of tungsten or tungsten silicon.

14. A method for forming a deflectable semiconductor mirror structure comprising:
    providing a mirror substructure disposed on a release layer disposed on a substrate, said mirror substructure comprising an upper oxide layer disposed over a metal layer disposed over a lower oxide layer;
    forming a releasable protect layer over said mirror substructure;
    etching to form an etched discrete structure of said mirror substructure and said releasable protect layer; and
    forming oxide spacers laterally adjacent said etched discrete structure by blanket oxide etching an oxide film formed over said etched discrete structure and terminating said blanket oxide etching when said releasable protect layer is exposed.

15. A method for forming a semiconductor DLP light switch comprising the method as in claim 14 and further comprising removing said releasable protect layer and said release layer.

16. A method for forming a deflectable semiconductor mirror structure, comprising:
    providing a mirror substructure disposed on a release layer formed over substrate, said mirror substructure comprising an upper oxide layer disposed over a metallic layer disposed over a lower oxide layer;
    etching said mirror substructure to form sidewalls; and
    forming oxide spacers on said sidewalls from a film other than said upper oxide layer, while retaining said upper oxide layer substantially intact.

17. The method as in claim 16, further comprising forming a releasable protect layer over said mirror substructure prior to said etching and wherein said forming said oxide spacers comprises forming a further oxide layer over said releasable protect layer following said etching and blanket etching said further oxide film, and further comprising removing said releasable protect layer.

18. The method as in claim 16, wherein said providing a mirror substructure further includes a releasable protect layer disposed over said upper oxide layer and said forming oxide spacers comprises forming a further oxide layer over said mirror substructure and blanket etching said further oxide film.

* * * * *